United States Patent [19]
Boi

[11] Patent Number: 5,635,013
[45] Date of Patent: Jun. 3, 1997

[54] PROCESS FOR PRODUCING COMPOSITE PANELS

[75] Inventor: Claude Boi, Bouc Bel Air, France

[73] Assignee: Societe Anonyme dite: Eurocopter France, Marseille, France

[21] Appl. No.: 555,429

[22] Filed: Nov. 9, 1995

[30] Foreign Application Priority Data

Nov. 9, 1994 [FR] France .................................. 94 13458

[51] Int. Cl.⁶ ...................................................... B32B 31/18
[52] U.S. Cl. ...................... 156/285; 156/307.3; 156/312; 156/315; 264/510
[58] Field of Search ................................ 156/285, 307.1, 156/307.3, 311, 312, 315; 264/510, 511, 516

[56] References Cited

U.S. PATENT DOCUMENTS

| | | | |
|---|---|---|---|
| 3,703,422 | 11/1972 | Yoshino | 156/307.3 |
| 3,879,245 | 4/1975 | Fetherston et al. | |
| 5,242,651 | 9/1993 | Brayden et al. | 264/516 |
| 5,248,242 | 9/1993 | Lallo et al. | 264/258 |
| 5,527,414 | 6/1996 | Dublinski et al. | 156/312 |

FOREIGN PATENT DOCUMENTS

| | | |
|---|---|---|
| 0311931A2 | 4/1989 | European Pat. Off. . |
| 2606703A1 | 5/1988 | France . |
| 2658116A1 | 8/1991 | France . |
| 3419292A1 | 11/1985 | Germany . |
| 3444321A1 | 6/1986 | Germany . |
| 89/03761 | 5/1989 | WIPO . |

*Primary Examiner*—Michele K. Yoder
*Attorney, Agent, or Firm*—Watson Cole Stevens Davis P.L.L.C.

[57] ABSTRACT

The process produces a sandwich composite panel including at least one cellular core having on its faces skins of fiber/resin composite material which are fastened to the cellular core. At least one strip of composite material is formed, the profile of which corresponds to that of the peripheral flank of the panel preform. The strip is applied against the flank of the panel preform. The preform, provided with at least one such strip on its border, is subjected to a temperature, rise, without positive pressure being applied, until the resin of the strip has cured and then, after the curing of the strip and before the curing of the resin of the skins, is subjected to the continuation of the temperature rise, with positive pressure being applied.

8 Claims, 3 Drawing Sheets

PROCESS FOR PRODUCING COMPOSITE PANELS

BACKGROUND OF THE INVENTION

The present invention relates to a process for producing composite panels of the sandwich type, as well as to the sandwich composite panels obtained by implementing said process.

It is known that composite panels of the sandwich type consist of a thick cellular core (for example of the honeycomb type) fastened to two external skins, formed by fibers impregnated with polymerized resin and arranged on either side of said cellular core. In addition, it is known that such panels are being more and more frequently used, especially because of their high rigidity and their great dimensional stability, for producing structural elements, for example those intended for aircraft.

The cellular core of these panels may be metallic or organic, with honeycombed cells of square or hexagonal cross section. Such a cellular core has a high compressive strength in a direction orthogonal to its plane, but is not very good at withstanding compression parallel to its plane. As regards said skins, these may each be formed from plies composed of several superposed layers and consisting of fibers impregnated with thermosetting resin. The fibers constituting these plies may be woven or nonwoven and they are oriented in directions chosen according to the desired mechanical properties of the panels. Such fibers may be carbon fibers, glass fibers, kevlar (registered trademark) fibers, etc., depending on the application envisaged.

In order to manufacture such sandwich composite panels, the cellular core and the plies which cover its faces are placed inside an autoclave or similar device, in which the panel preform, consisting of said core and said plies, is subjected to a hot polymerization cycle under pressure. The pressure is, for example, obtained by placing said panel preform in an airtight case or vacuum bag in which a partial vacuum (a few tenths of a bar) is created and by applying a certain pressure to the outside of this airtight case (a few bar).

Along the borders of the panel, the plies covering both faces of the core and the flank of said cellular core are extended beyond the peripheral edge of said core and they are fastened together during polymerization, so as to create a peripheral border. Such a peripheral border enables the panel to be fixed to a support frame or to another panel by any fixing means such as bolts, rivets or adhesive.

When the panel preform is pressurized during polymerization, the periphery of said cellular core is critical region as regards correct adhesion of the skins to this core. The reason for this is that, in this region, the force due to the pressure exerted on the preform comprises a lateral component, oriented inwards parallel to the faces of the panel, which the cellular core cannot oppose with a sufficient counterpressure on account of its low compressive strength in this direction. Consequently, the cellular core tends to deform locally at its periphery, so that a satisfactory bond between the skins and this core cannot be obtained, such deformation increasing as the dimensions of the cells of said core increase.

Attempts have already been made to remedy this drawback.

For example, it has already been considered to deposit a film of intumescent adhesive on the edge of the cellular core. Thus, during hot polymerization, the intumescent adhesive increases in volume and fills the cells. In order to prevent any deformation occurring before this product has become sufficiently rigid, a system of strips is arranged laterally over the entire periphery of the panel and serves to transmit the pressure to the edges of the panel during polymerization. Such a known method of stiffening the borders results in an appreciable increase in the weight of the composite panels since the weight of the intumescent product approximately 80 grams per linear meter. In addition, the necessity of using a system of strips leads to having to use complicated tooling and to a relatively long manufacturing time, and consequently to an excessive cost which is further accentuated by the difficulties in automating this process in order to make it suitable for industrial-scale production.

As regards Patent EP-A-0,311,931, this describes a process consisting in arranging a honeycombed frame, the cells of which are arranged in a direction inclined with respect to the plane of the panel, on the periphery of the honeycombed core and in cutting this frame in a bevel so as to form a peripheral flank substantially normal to this inclined direction. Such a process enables a panel to be obtained in which the flank is reinforced without any increase in weight, but the manufacturing time remains relatively long, the cost of the panel remains relatively high and automated manufacture is difficult to implement.

Moreover, Patent FR-A-2,658,116 describes a process consisting in cutting the edge of said cellular core in a bevel, in depositing a film of hotmelt adhesive on the edge thus cut, in heating this film of adhesive so as to liquefy the latter and to cause it to be deposited by capillary effect on those walls of said core which are adjacent to the cut edge, and then in cooling the hotmelt adhesive so as to cause it to become rigid and to stiffen the walls of the core adjacent to the cut edge.

This latter process enables the edge of said core to be sufficiently strengthened so that the latter can support the pressure applied during polymerization, without incurring too high a weight penalty, and for a manufacturing time which is substantially shorter than that for the other known processes, so as to result in a significant reduction in the manufacturing cost and in the scrap rates, it being possible furthermore for this process to be automated within the context of industrial-scale manufacture of the panels. However, such a process requires the edge of the core to be cut in a bevel, the angle of said bevel preferably being between 25° and 40°.

SUMMARY OF THE INVENTION

The object of the present invention is to remedy the drawbacks of the known processes recalled hereinabove, and it relates to a process which, compared to these known processes, has certain advantages such as a saving in weight and in manufacturing time, an increase in the mechanical strength, an improvement in the appearance of the finished product, easy implementation (whether or not the edge of the core has a bevel and irrespective of the angle of the possible bevel) and the possibility of being extended to the production of panels which are made into complex shapes.

To this end, according to the invention, the process for producing a sandwich composite panel consisting of at least one cellular core having on its faces skins of fiber/resin composite material which are fastened to it, according to which process:

the peripheral flank of said cellular core is given a desired profile;
a sandwich composite panel preform is formed by covering the faces of said cellular core with flexible plies of fibers impregnated with a first thermosetting resin, said flexible plies extending beyond said peripheral flank of said cellular core and being brought together so that at least one of them is in contact with said peripheral flank and so that, beyond said flank, they are superposed in order to form a projecting peripheral flange;

thereafter, said sandwich composition panel preform is subjected to a cycle for polymerizing said first thermosetting resin so as to fasten said plies to said cellular core and to cure them so that they form said skins, said polymerization cycle consisting of a temperature rise with application of pressure, is noteworthy:

in that at least one strip is formed from a flexible sheet of a composite material consisting of fibers impregnated with a second thermosetting resin, the profile of which strip corresponds to that of the peripheral edge of said preform and which includes two external portions connected by an intermediate portion;

in that, before application of said polymerization cycle, said strip is put into place on the border of said preform so that, simultaneously, said external portions are respectively applied against one face of said preform and against said flange, while said intermediate portion is applied against the flank of said preform;

in that said first and second thermosetting resins are chosen so that, during a temperature rise, the curing of said second resin occurs before that of said first resin; and in that said preform, provided with at least one such bordering strip, is subjected just to a temperature rise, without pressure being applied, until said second resin has cured and then, after the curing of said second resin and before the curing of the first resin, is subjected to the continuation of said temperature rise and with pressure being applied, the application of temperature and pressure being continued until said first resin has fully cured.

Thus, by virtue of the present invention, the strip, which is initially flexible, becomes rigid before said preform cures, so that said strip can serve as a forming tool on the peripheral border of the preform.

Preferably, so that the various flexible elements are strictly applied against one another before the curing of said strip and said preform, the latter is subjected to a slight reduction in pressure (for example—0.7 bar) during the temperature rise without pressure being applied.

In a known way, said pressure rise may include a hold period during which the temperature is maintained constant at a particular value. In the latter case, it is advantageous for the curing of said second resin impregnating the strip to start and finish respectively near the beginning and near the end of said of hold period, whereas the curing of said first resin impregnating the plies only starts near the end of said hold period.

It could be envisaged to use said cured strip as an additional border fastened to said preform.

However, in order specially to avoid having an excess weight, it is preferable for said strip to be removed after having served as the forming tool on the peripheral border of the preform. In this case, in order to prevent said cured strip from adhering to the preform, at least one film of a nonstick material is arranged between the preform and the said strip, before application of the heat treatment. Such films of nonstick material make it easier to carry out the demolding operation, while at the same time also evacuating (by suction due to the effect of the reduced pressure) the air and solvents which are released by the composite materials during the polymerization phase.

The profile given to the peripheral flank of the cellular core can have any shape desired. For example, as is usual, this shape may consist of a single bevel. As a variant, said flank could, for example, be shaped so that it has two opposed inclined faces, respectively connected to the faces of the cellular core and intersecting along a common line of intersection. Such inclined faces may be symmetrical so that said common line of intersection lies in the midplane of said cellular core, passing through the middle of its thickness. In this case, two strips similar to those described hereinabove are used, each of them being associated with one of said inclined faces.

The external portion of said strip, intended to be applied against one face of the preform, may be short and be applied solely against the peripheral part of said face of the preform, near the end.

However, such an external portion may be sufficiently wide to cover at least the major part of said face, so that the strip then has, at least approximately, the shape of a mold.

Said mold may then be used as a die block for a forming tool, possibly a complex one, the surface of which is matched by said sandwich composite panel preform.

Of course, the present invention also relates to a sandwich composite panel obtained by implementing the process described hereinabove.

The figures of the appended drawing will make it clearly understood how the invention can be realized. In these figures, identical references designate similar elements,

BRIEF DESCRIPTION OF THE DRAWINGS

FIG. 2a shows, as a function of time t, the variation in temperature T imposed on the preform of the sandwich composite panel;

FIG. 2b shows, as a function of time t, the variation in pressure P imposed on the preform of the sandwich composite panel;

FIG. 2c shows, as a function of time t, the variation in the rigidity R2 of the second resin impregnating the strip employed according to the invention;

FIG. 2d shows, as a function of time t, the variation in the rigidity R1 of the first resin impregnating the skins of the preform of the sandwich composite panel.

DESCRIPTION OF PREFERRED EMBODIMENTS

Figure 1:
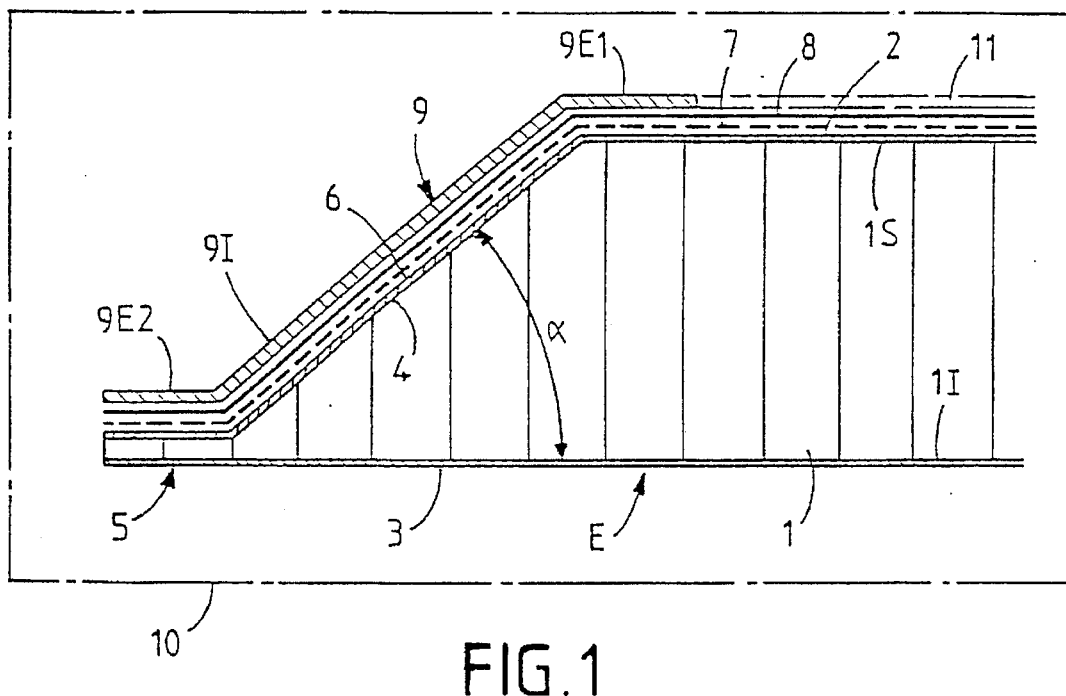
FIG. 1 shows diagrammatically an embodiment example of a sandwich composite panel in accordance with the present invention.
Figure 4:
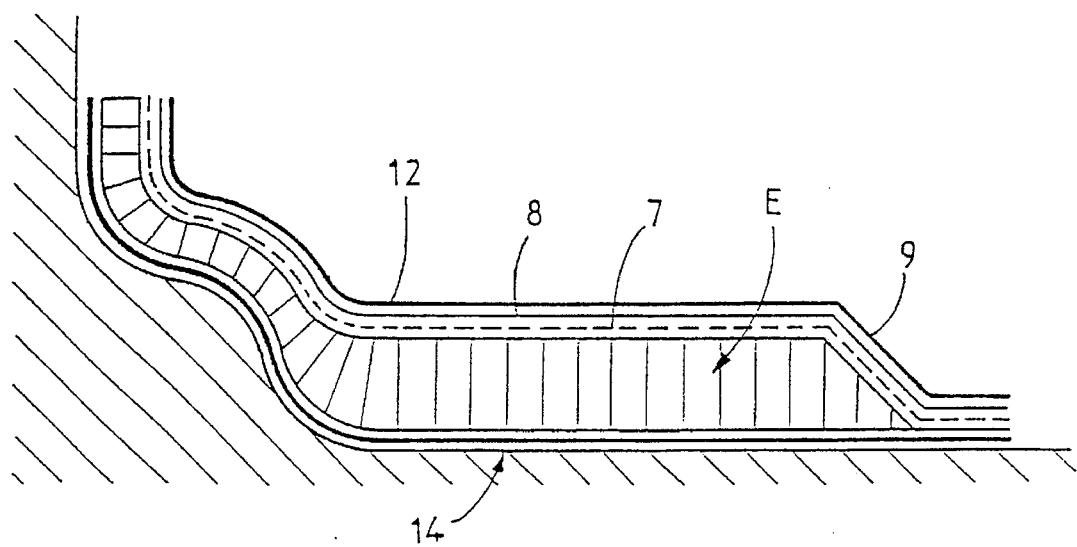
FIGS. 3 and 4 illustrate embodiment variants of the sandwich composite panel in accordance with the present invention.
Figure 3:
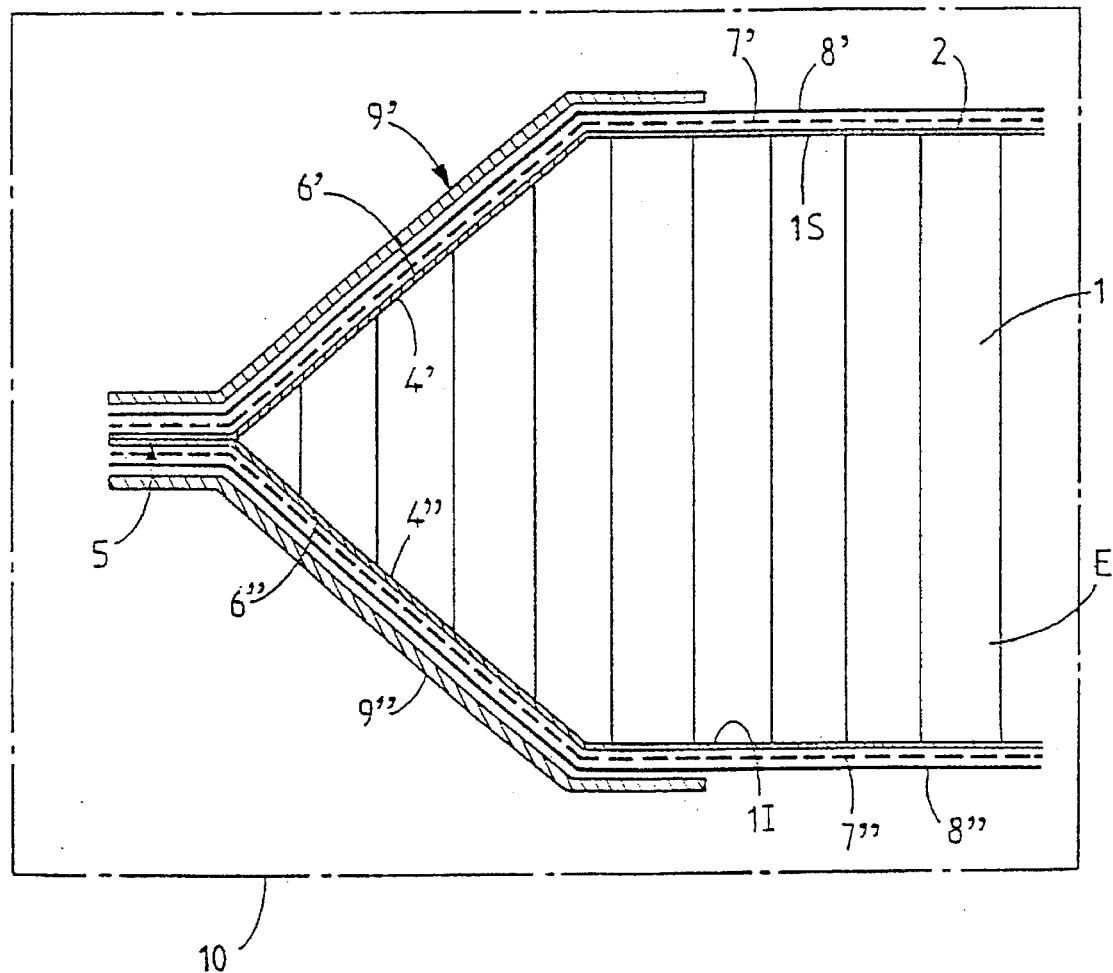

In FIGS. 1, 3 and 4, the various superposed elements applied against one another have been shown slightly spaced apart, for reasons of clarity.

The preform E of the sandwich composite panel according to the invention, shown diagrammatically and partially in FIG. 1, includes a cellular core 1, the upper and lower faces 1S and 1I of which are respectively covered with flexible plies 2 and 3 formed from fibers impregnated with a first thermosetting resin, for example the epoxy resin known commercially by the reference 145.7.

In the example shown, the peripheral edge of the cellular core 1 is cut in a bevel, so that the peripheral flank 4 of said core is formed by such a bevel. As will easily be deduced from the following, the angle α formed by said flank 4 with the faces 1S and 1I can have any value.

As may be seen in FIG. 1, the ply 2 is also applied against the flank 4 and the two plies 2 and 3, thus brought together, extend, toward the outside, beyond the peripheral flank 4, these plies being superposed in order to form a projecting flange 5.

Thus, the preform E is formed by the cellular core 1 and the plies 2 and 3 and its flank 6 is formed by that part of the ply 2 covering the flank 4 of the cellular core 1. The plies 2 and 3 are put into place on the core 1 by a laying-up operation for example.

As illustrated in FIG. 1, two superposed nonstick layers 7 and 8 of a peelable product, such as a polyester film, or of a perforated separator film, are arranged on the flange 5, the flank 6 and the ply 2.

In addition, a flexible strip 9 made from a composite material in sheet form, consisting of fibers impregnated with a second thermosetting resin, for example the epoxy resin known commercially by the reference M10, is arranged on the layers 7 and 8, at least near the flank 6 of the preform E. The flexible strip 9 has a profile corresponding to the flank 6 and it includes:

an external portion 9E1 intended to be applied, via the layers 7 and 8, against that part of the ply 2 covering the upper face 1S of the cellular core 1 near the edge 6;

an intermediate portion 9I intended to be applied, via the layers 7 and 8, against the flank 6 of the preform E; and another external portion 9E2 intended to be applied, via the layers 7 and 8, against the flange 5.

Figure 2A:
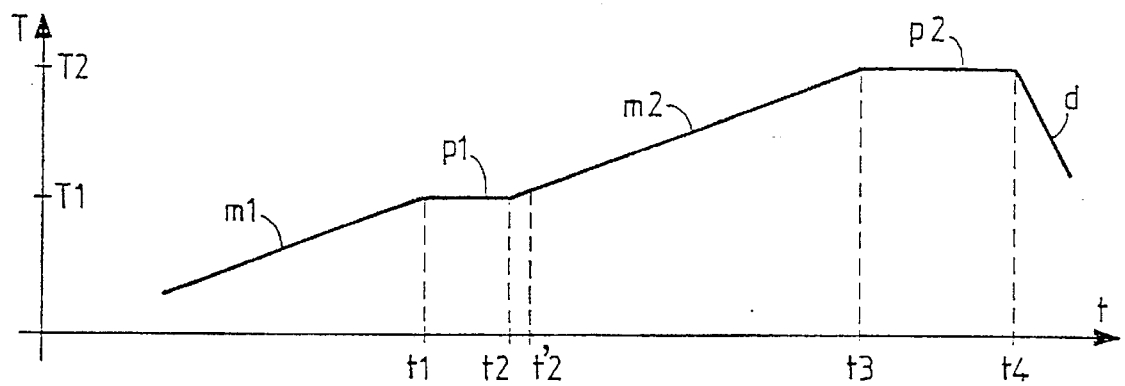
FIGS. 2a, 2b, 2c and 2d are diagrams illustrating diagrammatically the process for producing the panel in FIG. 1.
Figure 2B:
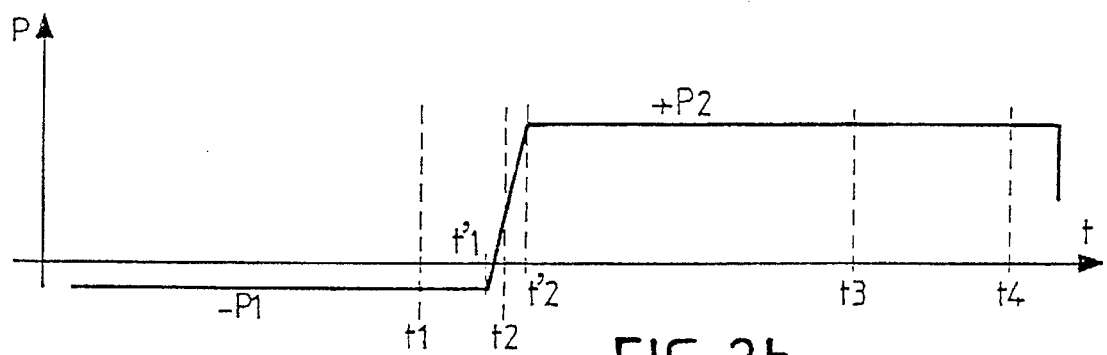

When the preform E is completed and is covered with the layers 7 and 8 and with the strip 9, the assembly E, 7, 8 and 9 is placed inside a chamber 10 (shown diagrammatically by a frame in dot/dash lines) and is subjected to a polymerization cycle illustrated by FIGS. 2a and 2b.

In the chamber 10, a slow temperature rise m1, for example 0.3° C. per minute, starts to be applied until a temperature T1 is reached at a time t1. Next, the temperature T1 is held constant for a hold period p1 lasting until time t2. After time t2, another temperature rise m2 is carried out until a temperature T2 is reached at time t3. The temperature T2 is held constant during another hold period p2 lasting until time t4. After time t4, the temperature is driven down, according to the fall d.

As regards the pressure P, this is held at a negative value of −P1 for a hold period until a time t'1 close to t2, when it is driven (for example with a Gradient of 0.1 bar/min) up to a positive value +P2 which it reaches at a time t'2 close to t2 and which it maintains until after time t4.

The general profile of the temperature and pressure variations, as illustrated by the diagrams in FIGS. 2 and 2b, are known and explained, for example, in document FR-A-2,658,116 mentioned hereinabove.

Figure 2C:
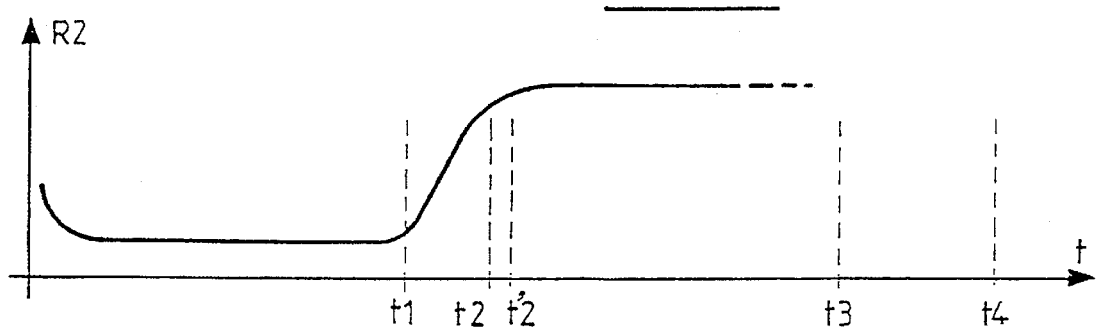
Figure 2D:
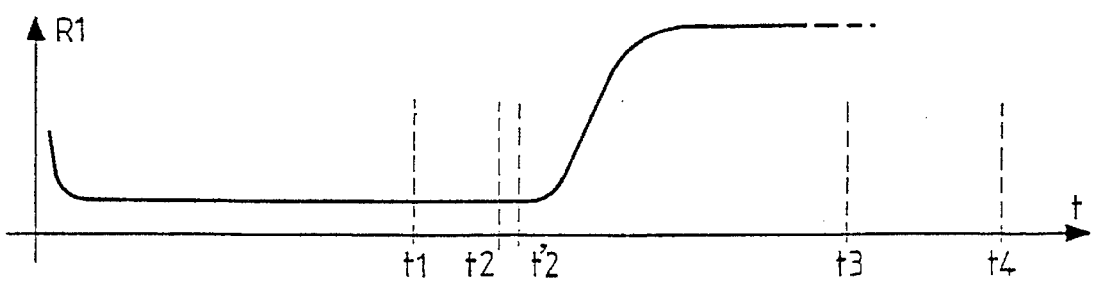

If the diagrams in FIGS. 2c and 2d are examined, it may be seen that, during the temperature rise m1, the first and second thermosetting resins impregnating respectively the plies 2 and 3, on the one hand, and the strip 9, on the other hand, become flexible and even possibly liquid. In addition, these diagrams show that the second thermosetting resin impregnating the strip 9 starts to cure near the time t1 at which the hold period p1 starts and has reached its maximum hardness near the times t2 and t'2, whereas the first thermosetting resin impregnating the plies 2 and 3 starts to cure after the times t2 and t'2.

From the foregoing, it may be noticed that:

the hold period of reduced pressure −P1 occurs while said first and second resins are soft, so that this hold period of reduced pressure has the effect of establishing excellent contact between the facing elements 1, 2, 3, 7, 8 and 9 and especially of enabling the strip 9 to match the precise shape of the flank 6 of the preform E;

the second resin impregnating the strip 9 starts to gel at the temperature T1, and at the time t1 which the hold period p1 starts, and it reaches its maximum-rigidity at the end of said hold period p1. The latter constitutes, as it were, a hold period for matching the strip 9 to the flank 6. At the end of the hold period p1, the strip 9 is rigid and can be subjected to the pressure P2, without it deforming;

at the end of the hold period p1, the first resin impregnating the plies 2 and 3 is in the gelling phase, whereas the strip 9 has already cured. Consequently, during the temperature rise m2, the pressure can be applied to the cured strip without encountering difficulties with regard to the stability of the shaping tools. During the temperature rise m2, the preform E becomes rigid and perfectly shaped to the strip 9 in the region of its flank 6, without said flank deforming and therefore without any adhesive effects between the skin 2 and 3 and the cellular core 1.

In the embodiment example in FIG. 1, the flank 4 of the circular core 1, and therefore also the flank 6 of the preform E, is shaped into a single bevel connecting the faces 1S and 1I so that the flange 5 lies in the extension of the ply 3.

The profile of the flanks 4 and 6 could have any desired shape. By way of example, FIG. 3 illustrates a flank having two converging and symmetrical bevels or faces 4' and 4". Of course, in this case, films of nonstick material 7', 7", 8', 8" and strips 9', 9", respectively similar to the films 7 and 8 and to the strip 9, are used to cure the flanks 6' and 6". The advantage of the embodiment shown in FIG. 3 consists in that the flange 5 lies in the midplane of the preform E, parallel to the faces 1S and 1I. The two strips 9' and 9" could possibly be fastened together by their portions 9E2 in order to form a single section.

In FIGS. 1 and 3, the external portion 9E1 of the strips 9, 9', 9" is short and just long enough to bear against that peripheral part of the ply 2 adjacent to the flank 6, 6', 6".

Of course, as is illustrated by the dotted lines in FIG. 1, said portion 9E1 could include an extension 11 which is applied extensively against the ply 2. In this case, the strip 9 may become a kind of mold enveloping the preform E. FIG. 4 shows such a mold 12 acting as a die block to a complex forming tool against which the preform E is placed.

It is then possible to obtain sandwich composite panels which, instead of being planar, have complex curved shapes.

Thus, by virtue of the present invention, it is no longer necessary to use stabilizing films of adhesive between the cellular core and the skins, as is anticipated in some of the prior art recalled hereinabove. This results in major advantages:

bonding of the cellular core to the skins by means of the first resin, for example a thermosetting epoxy, providing the panel with mechanical proper ties which are better than if an adhesive had been used: by way of indication, the plane shear strength is of the order of 25 MPa for an epoxy resin but only 10 MPa for a structural adhesive;

weight saving: 30 g per linear meter, for an ordinary panel for example;

a saving in time for processing the materials and polymerization in a single operation, contributing to improving the end-product.

I claim:

1. A process for producing a sandwich composite panel comprising at least one cellular core having opposite faces provided with skins of fiber/resin composite material which are fastened to said cellular core, said process comprising the steps of:

(a) giving the peripheral flank of said cellular core a given profile;

(b) forming a sandwich composite panel preform by covering the faces of said cellular core with flexible plies of fibers impregnated with a first thermosetting resin, said flexible plies extending beyond said peripheral flank of said cellular core and being brought together so that at least one of them is in contact with said peripheral flank and so that, beyond said flank, they are superposed in order to form a projecting peripheral flange;

(c) forming at least one strip from a flexible sheet of a composite material comprising fibers impregnated with a second thermosetting resin, the profile of said strip corresponding to that of the peripheral flank of said preform and including two external portions connected by an intermediate portion, said first and second thermosetting resins being chosen so that, during a temperature rise, curing of said second resin occurs before that of said first resin;

(d) placing said strip into place on the border of said preform so that, simultaneously, said external portions are respectively applied against one face of said preform and against said flange, while said intermediate portion is applied against the flank of said preform;

(e) subjecting said preform, provided with said at least one strip on said border, to a temperature rise, without positive pressure being applied, until said second resin has cured; and then (f) subjecting said preform to a continuation of said temperature rise, with positive pressure being applied, the application of temperature and positive pressure being continued until said first resin has fully cured.

2. The process as claimed in claim 1, wherein said preform is subjected to a reduction in pressure during the temperature rise without positive pressure being applied.

3. The process as claimed in claim 1, wherein a hold period, during which the temperature is held constant at a particular value, is inserted into said temperature rise, wherein:

(a) the curing of said second resin impregnating said strip starts and finishes respectively near the start and near the end of said hold period; and (b) the curing of said first resin impregnating said plies only starts near the end of said hold period.

4. The process as claimed in claim 1, further comprising arranging at least one film of a non-stick material between said preform and said strip.

5. The process as claimed in claim 1, wherein said peripheral flank of the cellular core is cut in a bevel.

6. The process as claimed in claim 1, wherein said peripheral flank of the cellular core has two opposed inclined faces.

7. The process as claimed in claim 1, wherein the external portion of said strip, applied against one face of said preform, covers at least the major part of said face so that said strip has, at least approximately, the shape of a mold.

8. The process as claimed in claim 7, wherein said mold constitutes a die block for a forming tool against which said composite panel is shaped.

* * * * *